United States Patent
Tsukamoto

[19]

[11] Patent Number: 6,152,584
[45] Date of Patent: Nov. 28, 2000

[54] VEHICLE HEADLIGHT

[75] Inventor: Michio Tsukamoto, Shizuoka, Japan

[73] Assignee: Koito Manufacturing Co., Ltd., Tokyo, Japan

[21] Appl. No.: 09/382,827

[22] Filed: Aug. 25, 1999

[30] Foreign Application Priority Data

Sep. 17, 1998 [JP] Japan .................................. 10-262821

[51] Int. Cl.[7] .................................................. B60Q 1/00
[52] U.S. Cl. .......................................... 362/465; 362/508
[58] Field of Search ................................... 362/507, 508, 362/512, 523, 526, 465, 467, 514, 282, 284, 286

[56] References Cited

U.S. PATENT DOCUMENTS

| 4,674,013 | 6/1987 | Manzoni | 362/467 |
| 5,769,525 | 6/1998 | Daumueller | 362/255 |
| 5,911,502 | 6/1999 | Zillgitt | 362/508 |
| 6,039,466 | 3/2000 | Duchenne | 362/515 |

*Primary Examiner*—Thomas M. Sember
*Assistant Examiner*—Hargobind S. Sawhney
*Attorney, Agent, or Firm*—Sughrue, Mion, Zinn, Macpeak & Seas, PLLC

[57] ABSTRACT

The improved vehicle headlight has both leveling device and beam switching device which drives bulb displacing mechanism to displace light source bulb relative to reflector along its optical axis. In addition to driving the bulb displacing mechanism to displace the light source bulb relatively in a determined amount, actuator of the leveling device is driven to tilt the reflector through a determined angle, whereby a low beam is switched to a high beam and vice versa. Compared to the conventional system that performs beam switching by merely driving the bulb displacing mechanism, the vehicle headlight enables the same bulb displacing mechanism to displace the light source bulb through simple relative movements.

13 Claims, 12 Drawing Sheets

LOW BEAM

FIG. 5b

HIGH BEAM

LOW BEAM

FIG. 9b

HIGH BEAM

FIG. 10a

LOW BEAM

HOT ZONE

FIG. 10b

HIGH BEAM

HOT ZONE

VEHICLE HEADLIGHT

BACKGROUND OF INVENTION

1. Field of the Invention

The present invention relates to a vehicle headlight equipped with a leveling device and a mechanically driven beam switching device.

2. Description of the Related Art

Vehicle headlights are adapted to project either a low beam or a high beam by causing the light from a light source bulb to be reflected in a forward direction. Since a low beam and a high beam are thrown in different directions, the light source (i.e., discharge light emitting portion or filament) is commonly differentiated between low and high beams. Also known are vehicle headlights using a single light source. This design is often inevitable with dual headlights using a discharge electric bulb as a light source bulb.

Vehicle headlights using a single light source are adapted to switch between a low beam and a high beam by mechanically displacing optical elements such as a light source bulb and a reflector and to this end they have a beam switching device. If the beam switching device is of such a type as to perform beam switching by displacing the light source bulb relative to the reflector, it is necessary that the light source be moved between specified positions while assuring high positional precision.

Figure 10A:
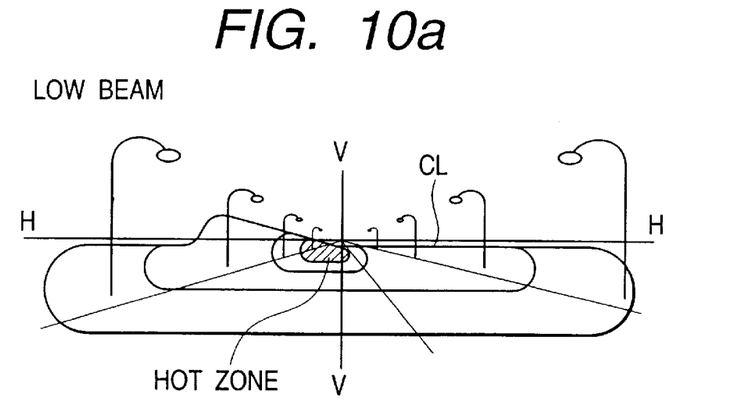
Figure 10B:
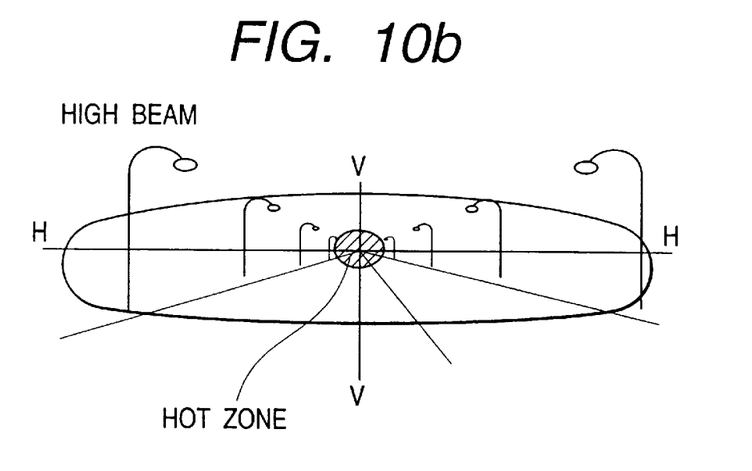
Figure 11:
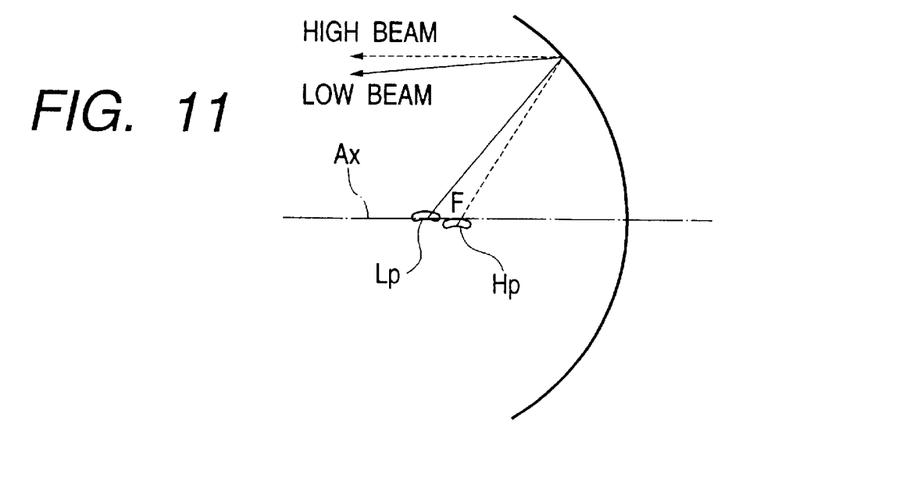
FIG. 11 is a side view showing a preferred layout of light source positions.

As shown in FIG. 10a, the ideal luminous intensity distribution pattern for a low beam satisfies the requirements for both providing good visibility in a forward direction for the driver and assuring anti-glare for the driver of an oncoming vehicle. FIG. 10b shows the ideal luminous intensity distribution pattern for a high beam that provides good visibility at far distance. In order to achieve this object using a reflector with the reflective surface of which is made of a paraboloid of revolution, it is usually the most effective to set the light source in low and high beam positions as shown in FIG. 11, where the high beam position Hp is backward and obliquely downward of the low beam position Lp along the optical axis Ax of the reflector. In FIG. 11, F designates the focal position of the paraboloid of revolution.

The same discussion holds with a step reflector the reflective surface of which is composed of a plurality of reflector elements and a reflector the reflective surface of which is composed of a free curved surface.

The above-described beam switching device which performs beam switching by merely displacing the light source bulb relative to the reflector has a difficulty in that if one wants to displace the light source bulb along the optical axis of the reflector and vertically relative to it, the bulb displacing mechanism for causing relative displacements of the light source bulb becomes complicated. As a further problem, the amounts of displacement of the light source bulb are set at specific values that are closely related to other optical elements such as the reflector and the lens and, hence, the bulb displacing mechanism must also have a dedicated structure adapted to these other optical elements. If the amounts of displacement of the light source bulb are to be altered on account of variations in the specifications of other optical elements, it is also necessary to use a new bulb displacing mechanism.

Figure 12A:
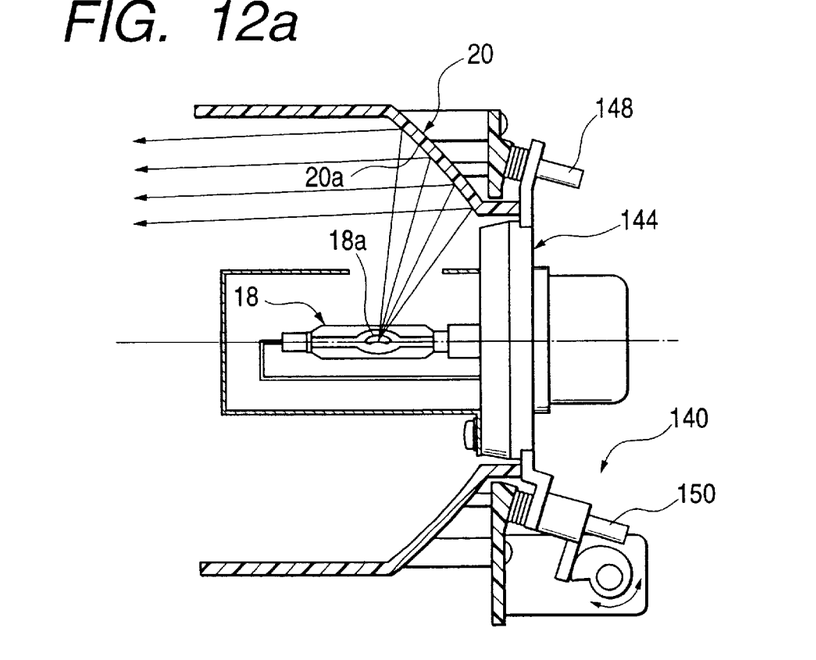
Figure 12B:
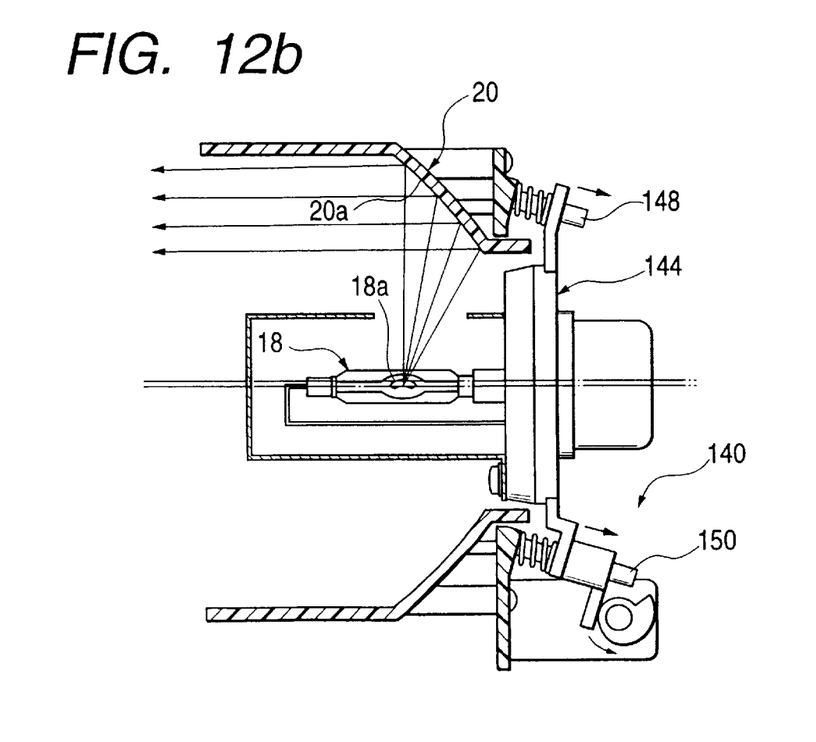

Consider, for example, the beam switching device shown in FIG. 12. To switch a low beam to a high beam, a bulb holder 144 of a light source bulb 18 is cam driven to be displaced linearly to a backward and obliquely downward position relative to a reflector 20 so that a light source 18a is moved parallel. A problem with this structure is its complexity since slide shafts 148 and 150 that compose a valve displacing mechanism 140 and the shaft inserting portion of the bulb holder 144 through which those shafts are supported have to be formed to extend downward at an angle. What is more, in order to change the relationship between the two light source positions Lp (low beam position) and Hp (high beam position), the angles of inclination of the shafts 148 and 150, and, hence, all related parts of the mechanism must be changed.

Figure 13A:
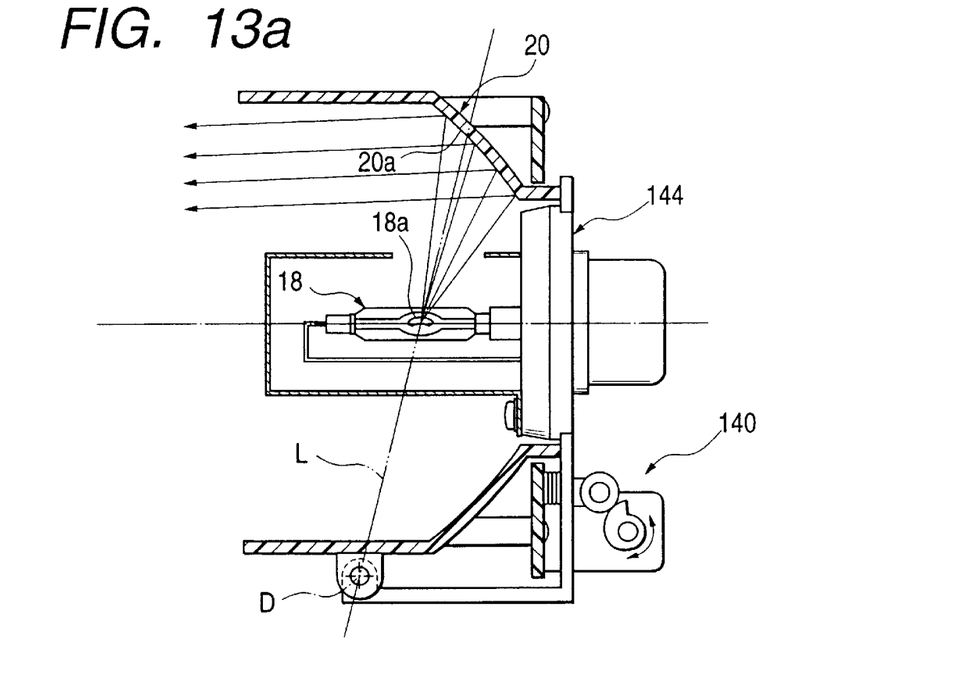
Figure 13B:
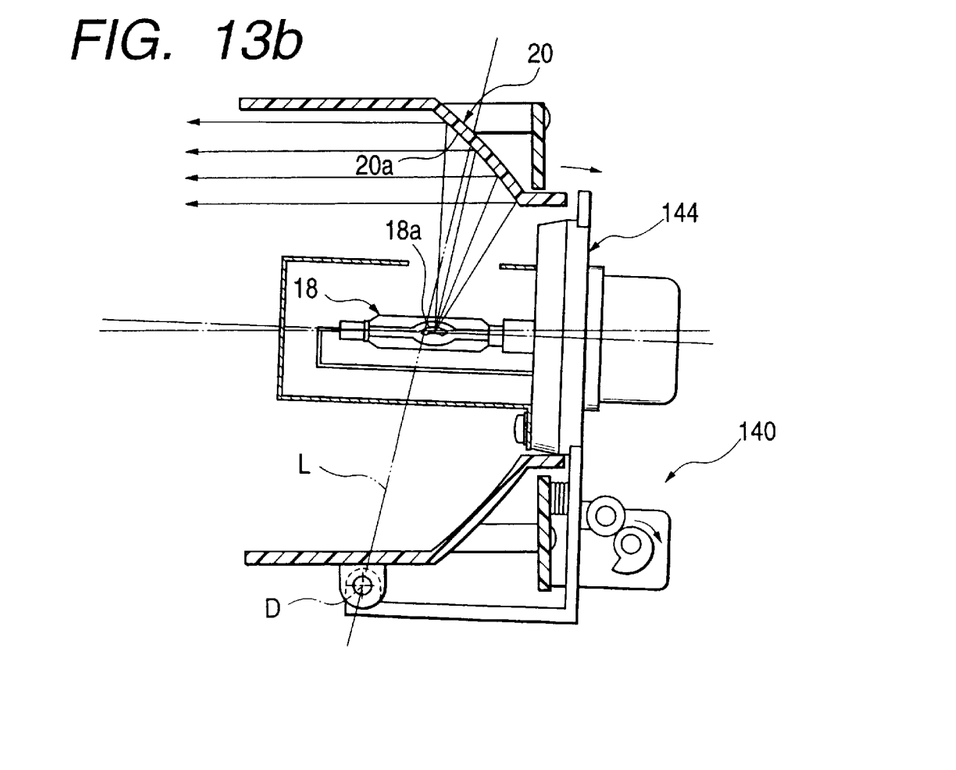

FIG. 13 shows another prior art beam switching device. To switch a low beam to a high beam, a bulb holder 144 of a light source bulb 18 is cam driven to pivot about a longitudinal axis D to move backward of a reflector 20 so that a light source 18a is moved backward and obliquely downward. In order to have the light source 18a positioned in either Lp or Hp by means of such a pivotal bulb displacing mechanism 140, the longitudinal axis D about which the bulb holder 144 pivots must be set on line L indicated by a one-long-and-two-short dashed line and this increases the size of the bulb displacing mechanism 140. As a further problem, if one wants to change the relationship between the two light source positions Lp and Hp, the position of the longitudinal axis D and, hence, all related parts of the mechanism must be changed.

SUMMARY OF THE INVENTION

In view of the above problems, it is an object of the present invention to provide a vehicle headlight that is adapted to switch between a low beam and a high beam by displacing a light source bulb relative to a reflector and which employs a bulb displacing mechanism in a beam switching device that is simple in construction and flexible in action.

Accordingly, to achieve the above objectives, the present invention is based on the fact that very few recent models of vehicle headlights are equipped with a leveling device that tilts a reflector either up or down so that the direction of beam throwing is varied vertically in accordance with the change in the position of the car body. On the basis of this fact, the present invention drives the actuator of the leveling device in combination with a bulb displacing mechanism to switch a low beam to a high beam and vice versa, thereby attaining the stated object of the present invention.

Therefore, to achieve the basic concept of the present invention, there is provided a vehicle headlight including the following: a light source bulb; a reflector that causes the light from the light source to be reflected in a forward direction to throw a beam in a determined luminous intensity distribution pattern; a leveling device that tilts the reflector either up or down so that the direction of said beam throwing is varied vertically in accordance with the change in the position of the car body; and a beam switching device that is mechanically driven to switch said beam selectively to either a low beam or a high beam. Furthermore, the beam switching device is equipped with a bulb displacing mechanism that displaces the light source bulb in a determined direction relative to the reflector, the beam switching being performed not only by driving the bulb displacing mechanism to displace the light source bulb relatively in a determined amount but also by driving the actuator of the leveling device to tilt the reflector through a determined angle.

The "light source bulb" mentioned above is not limited to any particular types of light source bulb and various types may be employed, as exemplified by a discharge electric bulb and an incandescent bulb (which may be a halogen bulb).

The "leveling device" may be an auto-leveling device with which the direction of throwing of a passing beam is automatically controlled to either up or down in accordance with the change in the position of the car body or it may be a manual leveling device with which the direction of throwing of a passing beam is manually adjusted to either up or down in accordance with the change in the position of the car body.

The "determined direction" and "determined amount" in which the light source bulb is displaced relatively by driving the bulb displacing mechanism are not limited in any particular direction and amount as long as in combination with the driving of the actuator of the leveling device, the bulb displacing mechanism is driven to cause relative displacements in such directions and amounts that the light source bulb can be positioned in such a way as to produce both a low beam and a high beam having the intended capabilities.

To further achieve the above objective, the vehicle headlight of the present invention has both a leveling device and a mechanically driven beam switching device. The beam switching device drives its bulb displacing mechanism to displace the light source bulb relatively in a determined amount and, in addition, the actuator of the leveling device is driven to tilt the reflector through a determined angle, whereby a low beam is switched to a high beam and vice versa. Compared to the prior art system that performs beam switching by merely driving the bulb displacing mechanism, the present invention enables the same bulb displacing mechanism to displace the light source bulb through simple relative movements. As a result, the bulb displacing mechanism can be adapted to have a simple construction and operate in a flexible action.

The simple construction of the bulb displacing mechanism offers the additional advantage of not only increasing the ease with which it can be mounted on a lighting device but also reducing the cost of the beam switching device.

As already mentioned, the "determined direction" in which the light source bulb is displaced relative to the reflector is not limited in any particular way. However, if, the "determined direction" is set parallel to the optical axis of the reflector, the direction and the amount in which the light source bulb is to be displaced can be easily calculated from the amount of displacement of the light source bulb parallel to the optical axis by the driving of the bulb displacing mechanism and from the angular amount of tilting of the reflector by the driving of the actuator of the leveling device. This contributes to further enhance the flexibility in the action of the bulb displacing mechanism.

BRIEF DESCRIPTION OF DRAWINGS

The above objectives and advantages of the present invention will become more apparent by describing in detail a preferred embodiment thereof with reference to the attached drawings in which:

FIG. 5($a$) and FIG. 5($b$) shows two modes of operation in luminous intensity distribution pattern according to the first embodiment;

FIGS. 9$a$ and 9$b$ show two modes of operation in luminous intensity distribution pattern according to the second embodiment;

FIG. 10$a$ and 10$b$ show ideal luminous intensity distribution patterns for a vehicle headlight;

FIG. 12($a$) and 12($b$) are longitudinal sections of a conventional vehicle headlight; and FIG. 13($a$) and 13($b$) are longitudinal sections of another conventional vehicle headlight.

DETAILED DESCRIPTION OF INVENTION

Hereinafter, a preferred embodiment of a vehicle headlight will be described in detail with reference to the attached drawings. However, the preferred embodiment is merely an example of the present invention, and thus, the specific features described below are merely used to more easily describe such embodiments and to provide an overall understanding of the present invention. Accordingly, one skilled in the art will readily recognize that the present invention is not limited to the specific embodiment described below. Furthermore, the description of various configurations of the present invention which would have been known to one skilled in the art are omitted for the sake of clarity and brevity.

Therefore, preferred embodiments of the present invention are described below with reference to the accompanying drawings.

To begin with, the first embodiment of the invention is described.

Figure 1:
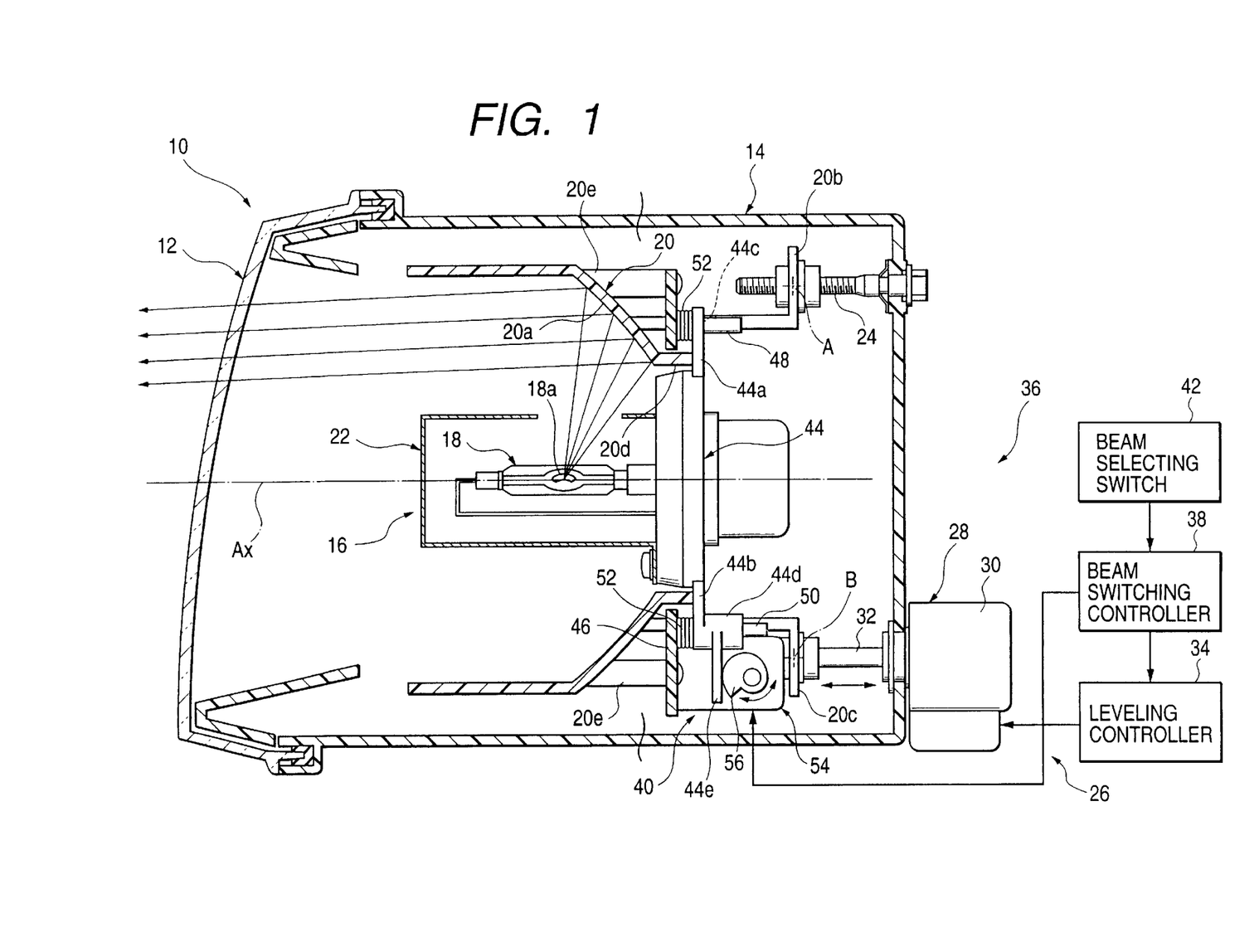
FIG. 1 is a longitudinal section of a vehicle headlight according to a first embodiment of the present invention.
Figure 2:
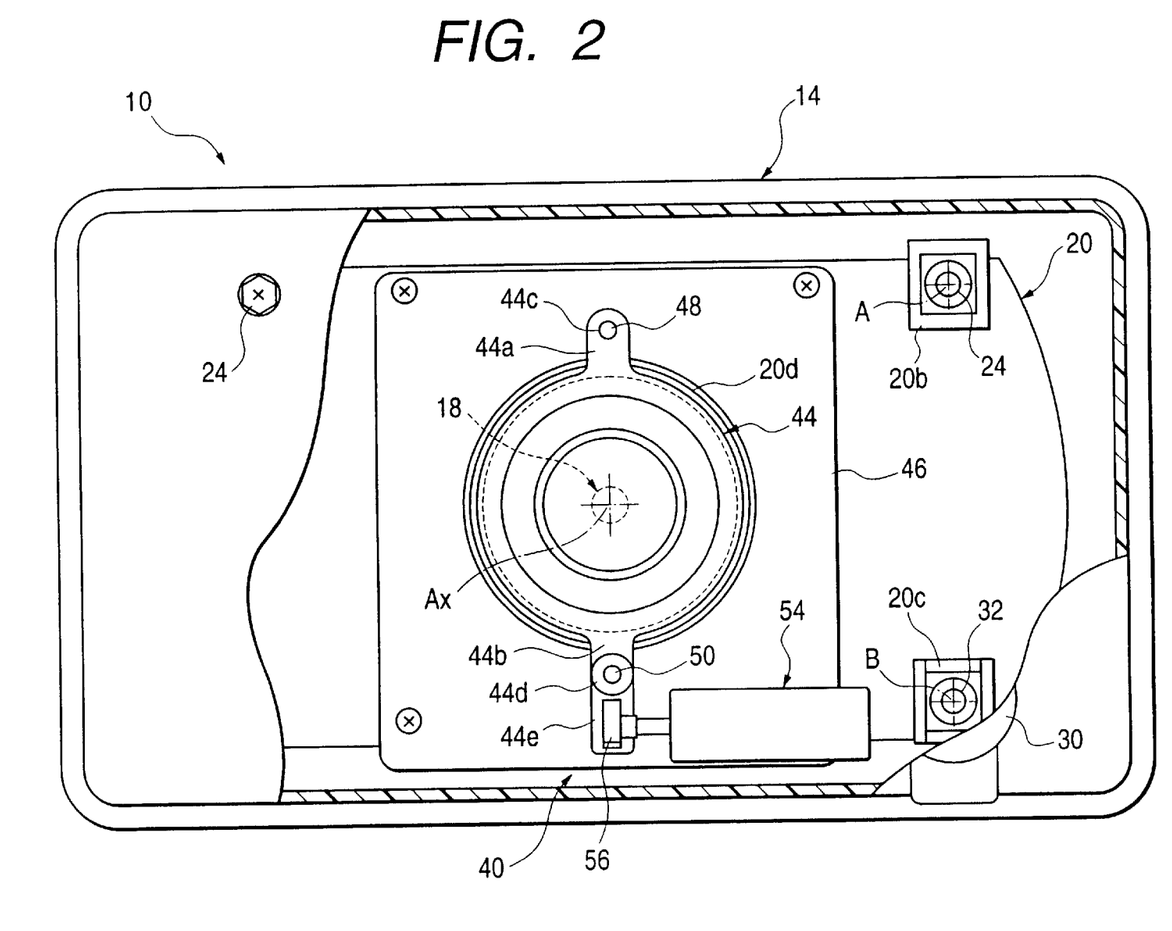
FIG. 2 is a rear view of the vehicle headlight shown in FIG. 1.

FIG. 1 is a longitudinal section of a vehicle headlight according to the first embodiment and FIG. 2 is a rear view of the same vehicle headlight.

As shown in FIGS. 1 and 2, the vehicle headlight 10 according to the first embodiment comprises a housing formed of a lens 12 and a lamp body 14 and a reflector unit 16 that is disposed to be tiltable in both vertical and horizontal directions.

The reflector unit 16 comprises a light source bulb (metal halide discharge electric bulb) 18, a reflector 20 that supports the light source bulb 18 with the aid of a bulb holder 44 (to be described below in detail), and a shade 22 securely supported on the bulb holder 44 in such a way that it surrounds the light source bulb 18 through a determined range.

The lens 12 has no refractive power and it is the reflector unit 16 that is provided with a capability for controlling the luminous intensity distribution. Stated more specifically, the reflector 20 has a reflective surface 20$a$ that allows the light from the discharge light-emitting portion 18$a$ of the light source bulb 18 to be reflected in a forward direction and the reflective surface 20$a$ has such diffusing, deflecting and reflecting capabilities to throw a beam in two different luminous intensity distribution patterns as described below.

The reflector 20 has a bracket 20$b$ formed at both right and left ends of the top portion and it is supported on the lamp body 14 via aiming screws 24 passed through the respective brackets 20b. The reflector 20 also has a bracket 20c formed at the right (or left) end of the bottom portion and it is supported on the lamp body 14 via an actuator 28 of a leveling device 26.

Figure 3:
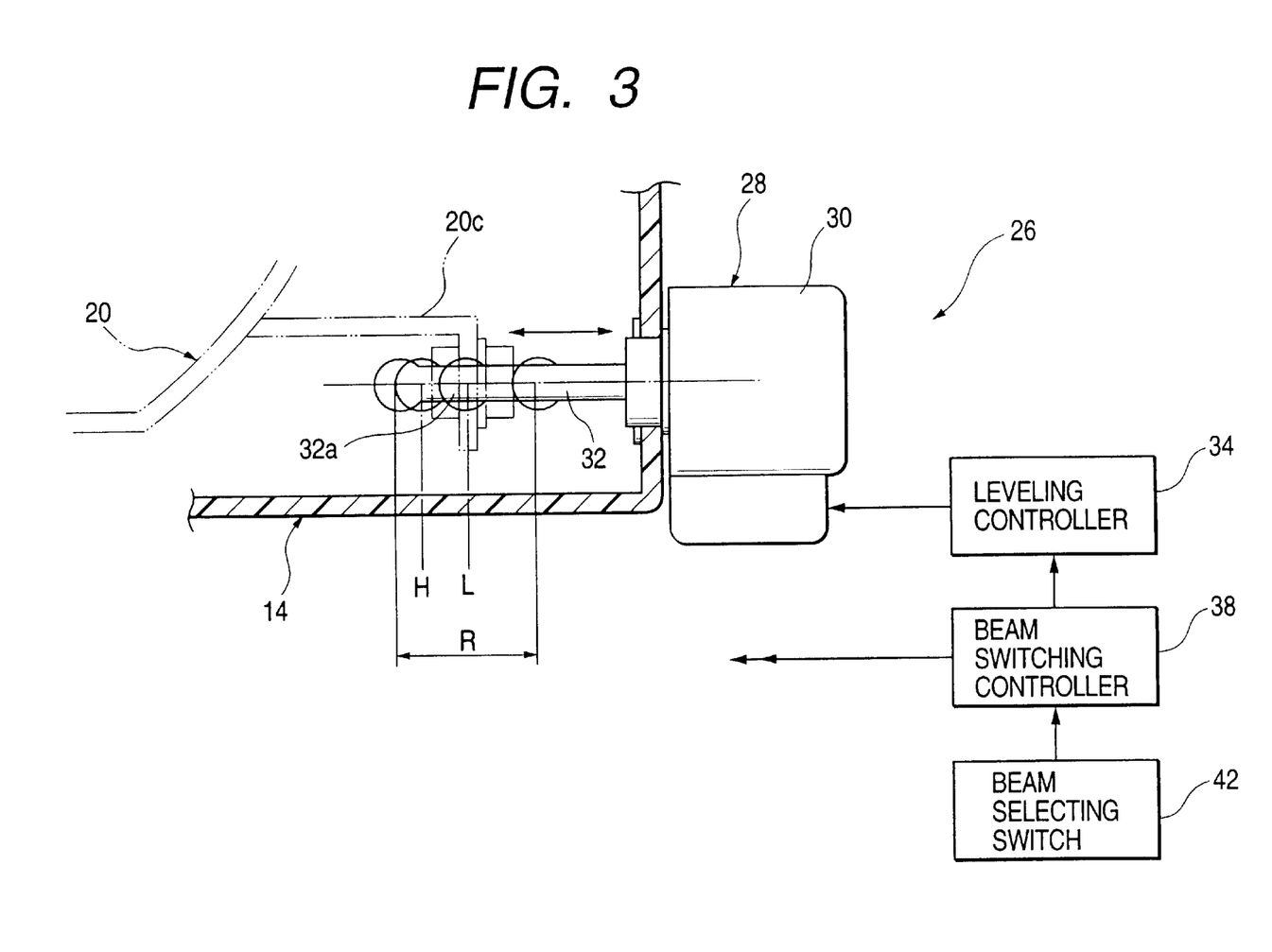
FIG. 3 is a side view showing details of the actuator of a leveling device in the first embodiment.

Details of the actuator 28 are shown in FIG. 3 and it comprises an actuator body 30 securely supported on the lamp body 14 and an output rod 32 projecting forward from the actuator body 30. The actuator 28 is adapted to be coupled to the bracket 20c in the reflector 20 at the spherical tip 32a of the output rod 32.

By means of a leveling controller 34, the leveling device 26 drives the actuator 28 in accordance with the change in the position of the car body so that the output rod 32 is displaced back and forth, whereupon the reflector unit 16 is tilted up and down, with point A (see FIG. 1) being the fulcrum and the action being exerted at point B, thereby ensuring that the direction of beam throwing is always kept optimal in accordance with the change in the position of the car body. This control in leveling is performed when the vehicle is running while throwing a low beam but not when the vehicle is running while throwing a high beam.

Figure 5A:
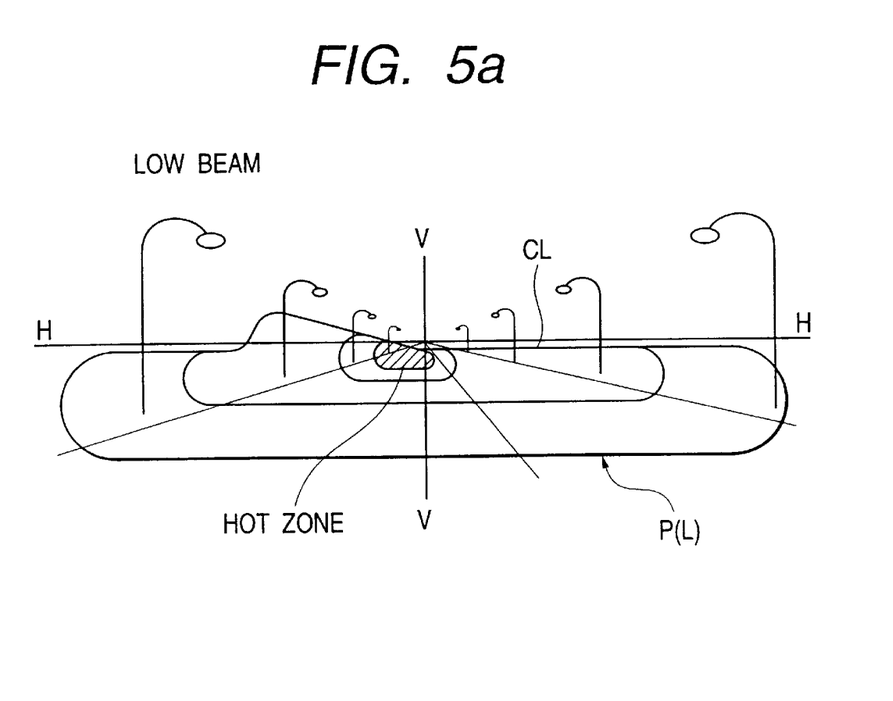

To adjust the optical axis of the reflector unit 16, the aiming screws 24 are adjusted with the output rod 32 of the actuator 28 being set in the reference position for leveling which is indicated by L in FIG. 3. The adjustment of the optical axis is performed until the optical axis Ax of the reflector 20 is directed 0.57° down (D) below the horizontal line and when the adjustment is complete, there is produced a low-beam producing luminous intensity distribution pattern P(L) as shown in FIG. 5a, which has a clear cutoff line CL (marking off bright and dark areas) and has the horizontal line portion positioned 0.57° D. The angular position to which the reflector 20 has been tilted to produce P(L) is hereunder referred to as the "reference angular position for leveling".

The multiple closed curves indicated by solid lines in the luminous intensity distribution pattern P(L) are zones which are illuminated the brighter as they are positioned the more inward; the central hatched zone is a "hot" zone which is illuminated the brightest.

The stroke of the range of adjustment of leveling is indicated by R in FIG. 3 and its settings are as follows: when the output rod 32 has displaced to the foremost end of the range R, the reflector 20 faces 2° up above the reference angular position for leveling; on the other hand, when the output rod 32 has displaced to the rearmost end of the range R, the reflector 20 faces 3° down below the reference angular position for leveling.

Control in leveling is not the sole function of the leveling device 26 and it also functions as part of a beam switching device 36 which switches a low beam to a high beam and vice versa.

The beam switching device 36 comprises a beam switching controller 38 and a bulb displacing mechanism 40 that displaces the light source bulb 18 relative to the reflector 20 in a direction parallel to its optical axis Ax. The beam switching device 36 is so adapted that it performs the above-mentioned beam switching by driving both the bulb displacing mechanism 40 and the leveling actuator 28 in the manner just described below.

If the beam switching controller 38 is supplied with a beam switching signal from a beam selecting switch 42, the controller 38 drives the bulb displacing mechanism 40 to displace the light source bulb 18 relatively in a determined amount and, at the same time, it outputs a beam switching signal to the leveling controller 34. In response to the input beam switching signal, the leveling controller 34 drives the actuator 28 to tilt the reflector 20 through a determined angle.

Figure 4:
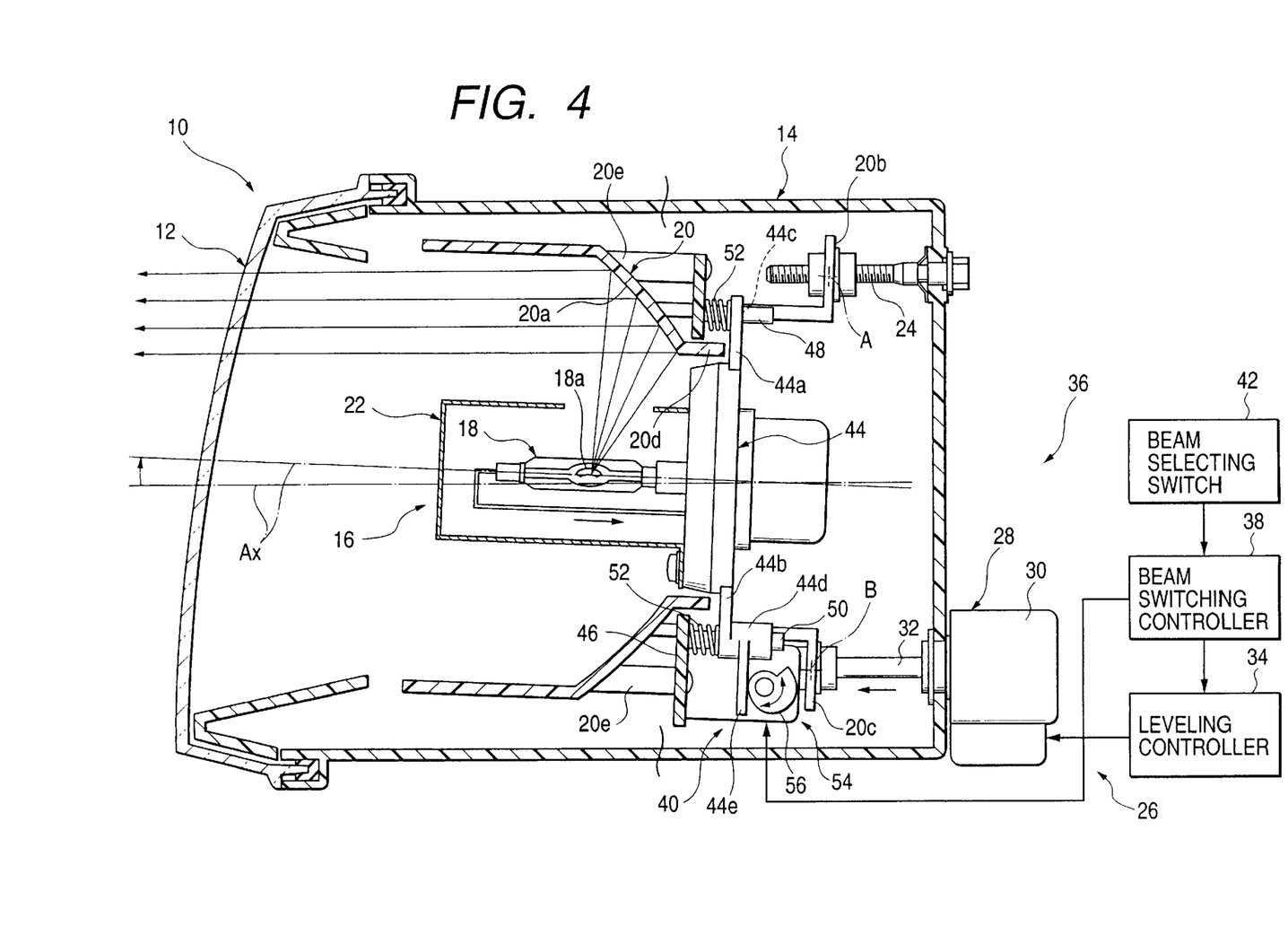
FIG. 4 is a longitudinal section showing how the vehicle headlight according to the first embodiment operates.

As shown in FIG. 3, if the leveling controller 34 is supplied with a high beam selecting signal from the beam switching controller 38, it displaces the output rod 32 of the actuator 28 to the high beam selecting position H which is set to lie within the leveling adjustment range R so that the reflector 16 is tilted to an angular position about 0.5–1.5° up above the reference angular position for leveling (see FIG. 4). As will be described below, the high beam selecting position H is so set that the hot zone of a high-beam producing luminous intensity distribution pattern will be formed near H-V.

As shown in FIG. 1, the light source bulb 18 is securely supported on the bulb holder 44 which, in turn, is supported on the reflector 20 in such a way that it can be displaced along the optical axis Ax of the reflector 20 by means of the bulb displacing mechanism 40.

Provided on the back side of the reflector 20 is a generally rectangular support plate 46 that surrounds an opening 20d made in the rear part of the reflector 20. The support plate 46 is screwed to the front faces of four bosses 20e formed on the back side of the reflector 20. Slide shafts 48 and 50 are formed on the support plate 46, one being above and the other below the optical axis Ax, in such a way that they both project rearward parallel to the optical axis Ax.

Tabs 44a and 44b are formed in the upper and lower parts of the bulb holder 44. The upper tab 44a has a hole 44c through which to pass the slide shaft 48 and the lower tab 44b has a sleeve 44d through which to pass the slide shaft 50. Formed below the sleeve 44d is a cam follower 44e in flat plate form that projects downward. A compressive spring 52 is loaded between the support plate 46 and the bulb holder 44 in diametrical positions where the slide shafts 48 and 50 are provided.

A bulb displacing actuator 54 is securely supported on the back side and in the lower part of the support plate 46 and a cam 56 is mounted on its output shaft. The cam 56 is provided to contact the cam follower 44e in the bulb holder 44 which is normally urged rearward by means of the compressive spring 52. When the cam 56 is in the rotating angular position indicated in FIG. 1, it causes the bulb holder 44 to counteract the resiliency of the compressive spring 52 and contact the rear opening 20d in the reflector 20. When the cam 56 is in the rotating angular position indicated in FIG. 4, the resiliency of the compressive spring 52 causes the bulb holder 44 to be displaced along the slide shafts 48 and 50 to a position backward from the rear opening 20d in the reflector 20 with a specified distance. As a result, the discharge light-emitting portion 18a of the light source bulb 18 is displaced rearward by a specified distance along the optical axis Ax to a new position which is set as the high-beam producing position of the light source. The rotating angular position of the cam 56 is changed in response to a beam switching signal that is supplied from the beam switching controller 38 into the bulb displacing actuator 54.

The amount by which the light source bulb 18 displaces along the optical axis Ax when a low beam is changed to a high beam and vice versa is set to be somewhat greater than one half the length of the discharge light-emitting portion 18a as measured along the optical axis Ax (a typical setting is about 3 mm).

Figure 5B:
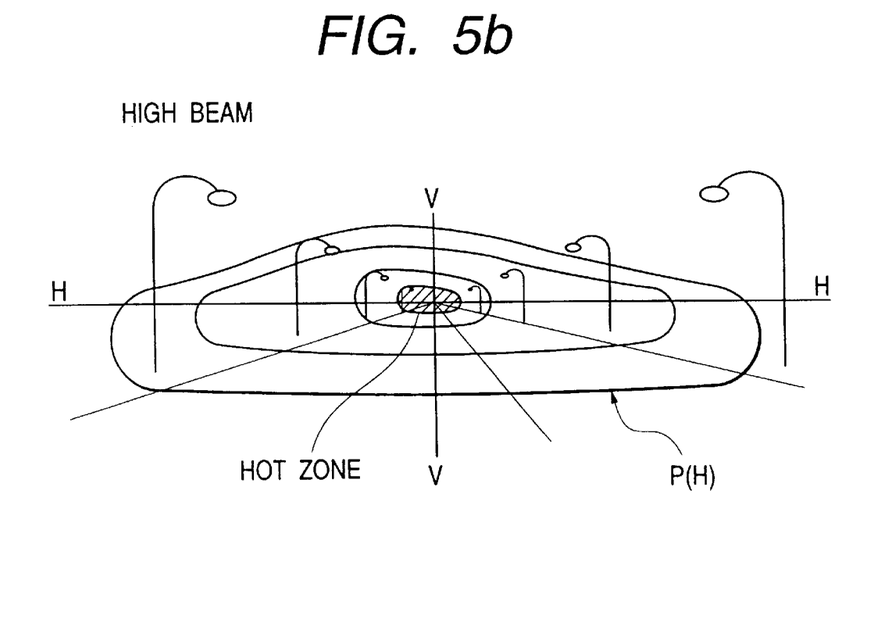

FIG. 5b shows a high-beam producing luminous intensity distribution pattern P(H) that is created when the reflector 20 has titled up to the high-beam producing angular position and when the light source bulb 18 has displaced to the high-beam producing light source position.

As shown, the pattern P(H) is 0.5–1.5° up above the low-beam producing luminous intensity distribution pattern P(L) shown in FIG. 5a and yet due to the relative, rearward displacement of the discharge light-emitting portion 18a of the light source bulb 18 along the optical axis Ax, more light is convergent in the H-V area (just in front of the lighting device) and there is hardly any trace of the cutoff line CL, thus producing a luminous intensity distribution pattern that is sufficient to assure good visibility at far distance when the car is driving while throwing a high beam.

As described above in detail, the vehicle headlight 10 according to the first embodiment of the invention has both the leveling device 26 and the mechanically driven beam switching device 36. The beam switching device 36 drives its bulb displacing mechanism 40 to displace the light source bulb 18 relatively in a determined amount and, in addition, the actuator 28 of the leveling device 26 is driven to tilt the reflector 20 through a determined angle, whereby a low beam is switched to a high beam and vice versa. Compared to the conventional system that performs beam switching by merely driving the bulb displacing mechanism, the first embodiment enables the same bulb displacing mechanism to displace the light source bulb through simple relative movements. As a result, the bulb displacing mechanism 40 can be adapted to have a simple construction and operate in a flexible action.

The simple construction of the bulb displacing mechanism 18 offers the additional advantage of not only increasing the ease with which it can be mounted on a lighting device but also reducing the cost of the beam switching device 36.

Further in the first embodiment, the direction in which the light source bulb 18 displaces relative to the reflector 20 is set to be parallel to its optical axis Ax, so the direction and the amount in which the light source bulb 18 is to be displaced can be easily calculated from the amount of displacement of the light source bulb 18 parallel to the reflector's optical axis by the driving of the bulb displacing mechanism 40 and from the amount of reflector tilting by the driving of the actuator of the leveling device 36. This contributes to further enhance the flexibility in the action of the bulb displacing mechanism 40.

The foregoing description of the first embodiment assumes that the slide shafts 48 and 50 are formed on the support plate 46. This is not the sole case of the invention and the slide shafts 48 and 50 may be directly formed on the rear side of the reflector 20. This alternative design helps further simplify the construction of the bulb displacing mechanism 40. It should be noted that in the first embodiment where the slide shafts 48 and 50 extend parallel to the optical axis Ax of the reflector 20, there are no practical problems involved in forming the slide shafts as integral part of the reflector 20 (in the prior art version shown in FIG. 12, the slide shafts 148 and 150 extend obliquely to the optical axis Ax of the reflector 20, so from a molding viewpoint, it is extremely difficult to form the shafts as integral part of the reflector 20.)

Now, a second embodiment of the present invention is described.

Figure 6:
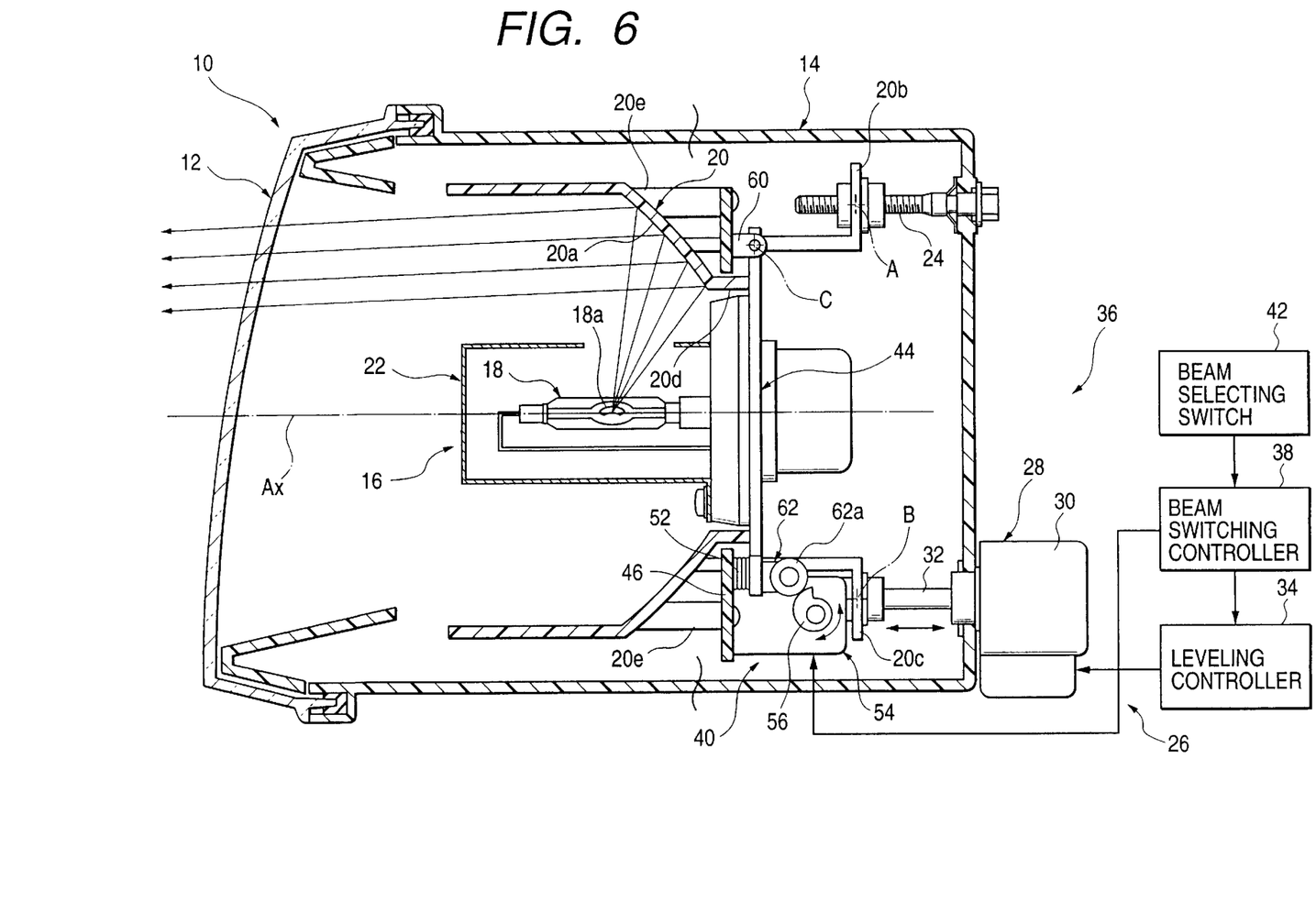
FIG. 6 is a longitudinal section of a vehicle headlight according to a second embodiment of the present invention.
Figure 7:
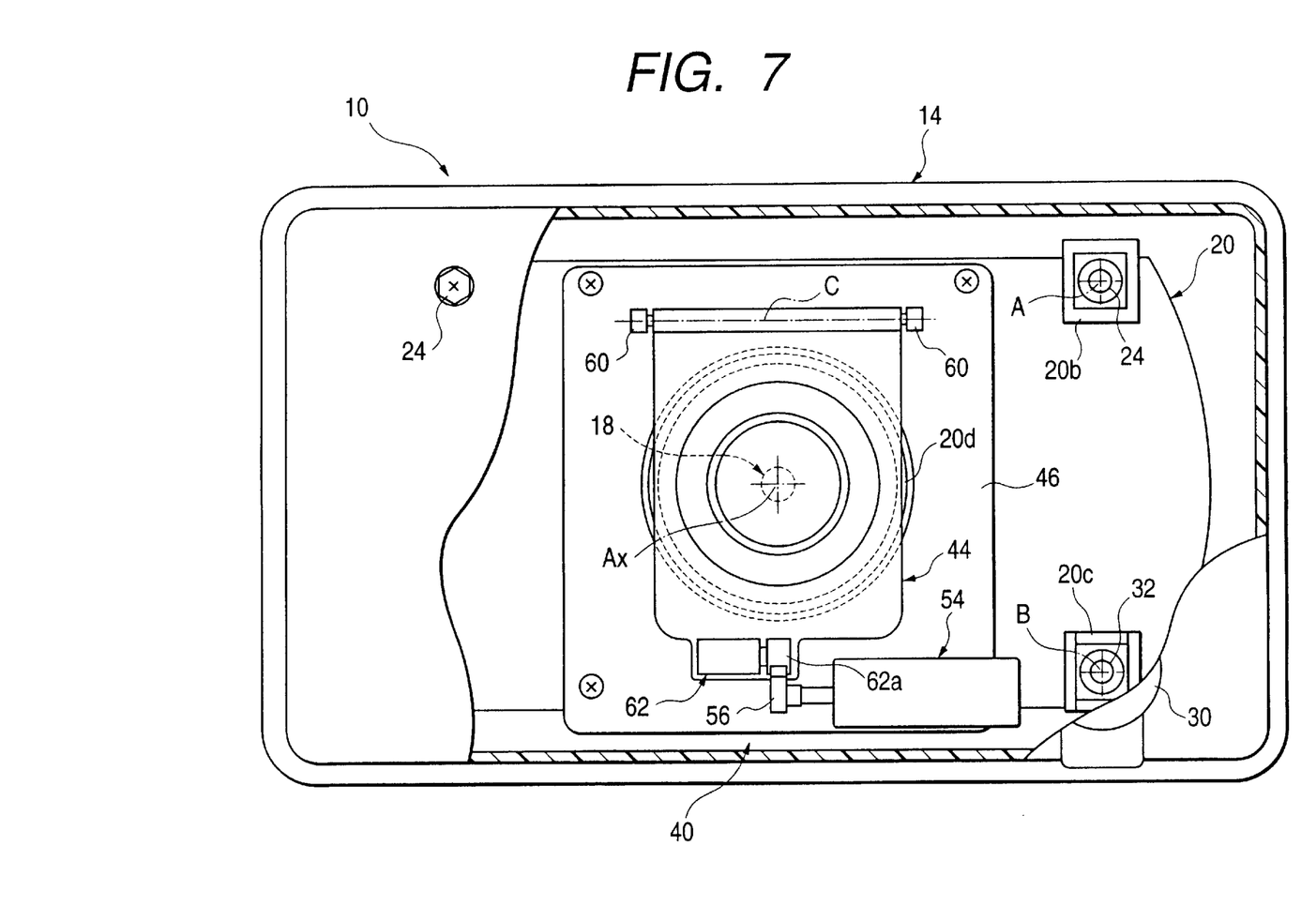
FIG. 7 is a rear view of the vehicle headlight shown in FIG. 6.

FIG. 6 is a longitudinal section of a vehicle headlight according to the second embodiment of the invention and FIG. 7 is a rear view of the same vehicle headlight.

As FIGS. 6 and 7 show, the vehicle headlight 10 according to the second embodiment is generally the same as the first embodiment in terms of the basic construction of the lighting device and the only difference is in the construction of the bulb displacing mechanism 40.

In the first embodiment, the light source bulb 18 is adapted to be linearly displaceable with respect to the reflector 20 in a direction parallel to its optical axis Ax; in the second embodiment, the light source bulb 18 is adapted to displace with respect to the reflector 20 by pivoting about a longitudinal axis C.

The bulb holder 44 according to the second embodiment is generally shaped like a rectangle and, at the upper end, supported on a support plate 46 via a pair of brackets 60 on it such that said bulb holder is pivotal about a longitudinal axis C.

A pulley unit 62 is securely supported on the back side of the bulb holder 44 at the lower end such that a cam 56 on a bulb displacing actuator 54 contacts a pulley 62a in the pulley unit 62. A compressive spring 52 is loaded between the support plate 46 and the bulb holder 44 at its lower end.

Figure 8:
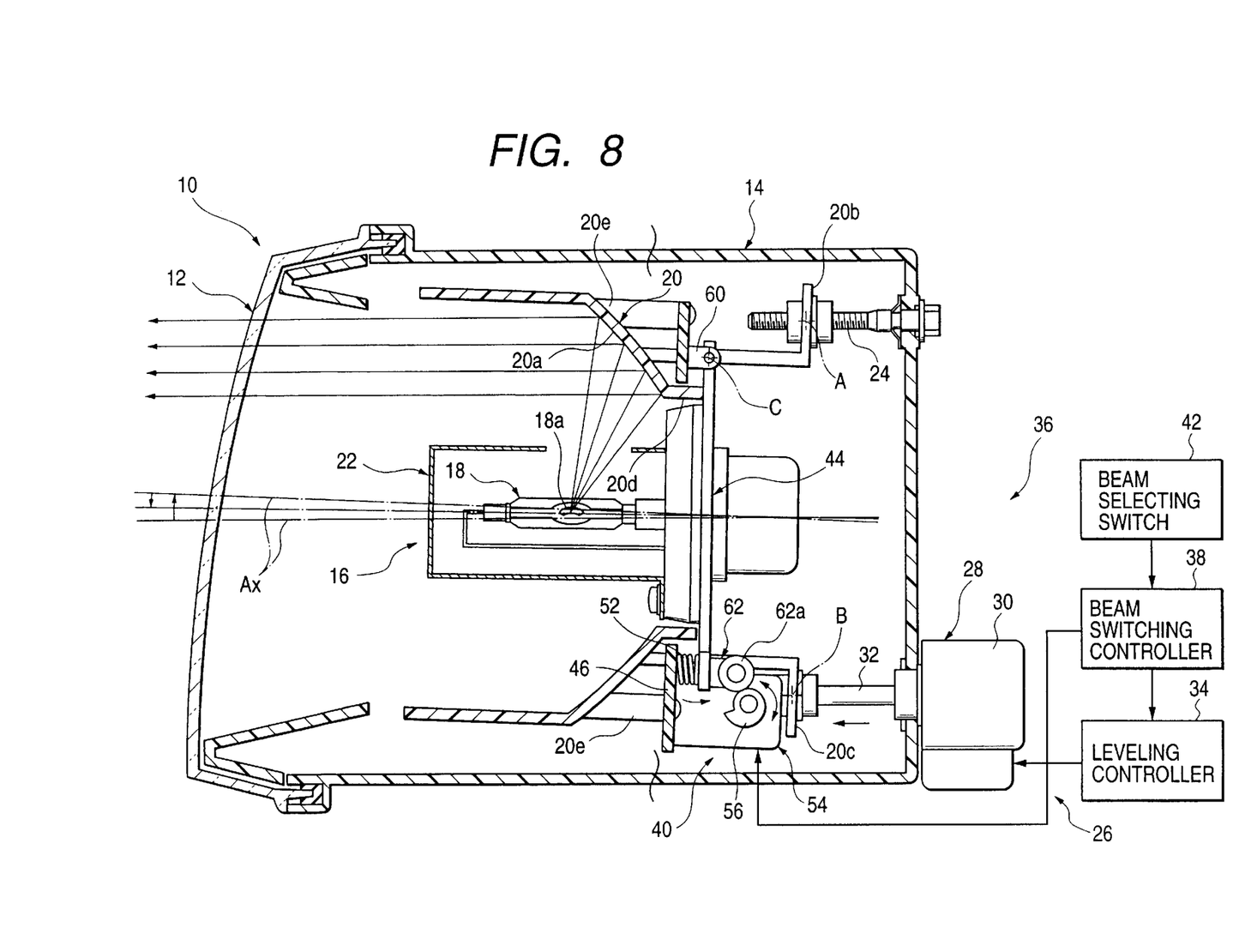
FIG. 8 is a longitudinal section showing how the vehicle headlight according to the second embodiment operates.

When the cam 56 is in the rotating angular position shown in FIG. 6, it causes the bulb holder 44 to counteract the resiliency of the compressive spring 52 and contact the rear opening 20d in the reflector 20. When the cam 56 is in the rotating angular position shown in FIG. 8, the resiliency of the compressive spring 52 causes the bulb holder 44 to pivot backward about the longitudinal axis C. As a result, the discharge light-emitting portion 18a of the light source bulb 18 also pivots backward through a determined angle about the longitudinal axis C so that it is displaced backward and obliquely downward to a new position which is set as the high-beam producing position of the light source.

Figure 9A:
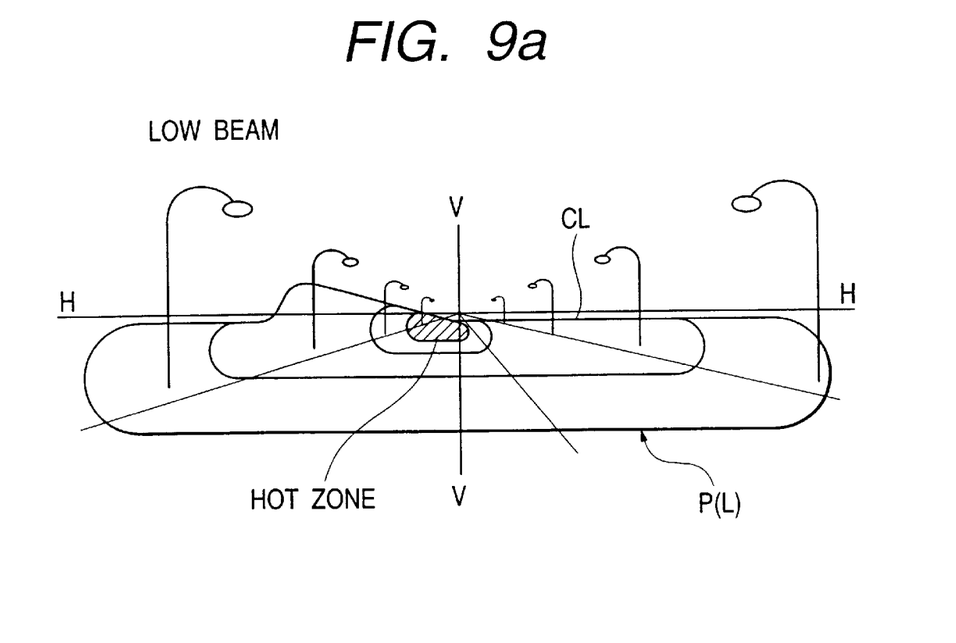
Figure 9B:
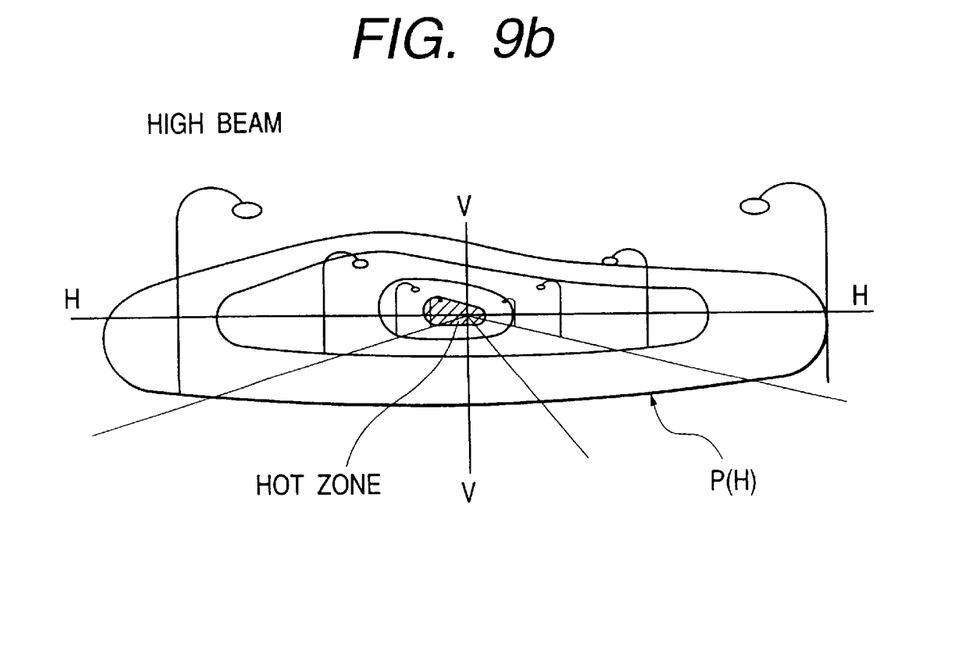

FIG. 9b shows a high-beam producing luminous intensity distribution pattern P(H) that is created when the reflector 20 has tilted up to the high-beam producing angular position and when the light source bulb 18 has displaced to the high-beam producing light source position.

As shown, the pattern P(H) is 0.5–1.5° up above the low-beam producing luminous intensity distribution pattern P(L) shown in FIG. 9a and yet due to the relative displacement of the discharge light-emitting portion 18a of the light source bulb 18 which is rearward and obliquely downward of the reflector 20, more light is convergent in the H-V area and there is hardly any trace of the cutoff line CL, thus producing a luminous intensity distribution pattern that is sufficient to assure good visibility at far distance when the car is driving while throwing a high beam. Compared to the first embodiment, the discharge light-emitting portion 18a is displaced by a smaller amount in the second embodiment and, hence, the convergence of light in the H-V area tends to be low; in practice, however, this problem can be solved and enhanced light convergence is attainable in the H-V area by setting the bulb holder 44 to pivot backward through a somewhat greater angle.

Thus, the second embodiment of the invention can achieve substantially the same advantages as that of the first embodiment.

The previous description of the preferred embodiments are provided to enable a person skilled in the art to make or use the present invention. Moreover, various modifications to the above embodiments will be readily apparent to those skilled in the art, and the generic principles defined herein may be applied to other embodiments without the use of inventive faculty. Therefore, the present invention is not intended to be limited to the embodiment described herein but is to be accorded the widest scope as defined by the claims.

What is claimed is:

1. A vehicle headlight comprising:

a light source bulb;

a reflector for reflecting light emitting from the light source bulb in a forward direction to form a beam having a predetermined distribution pattern;

a leveling device that tilts the reflector either up or down so that the beam moves vertically to a predetermined angle in accordance with a change in a vehicle-body position; and a beam switching device that is driven to switch the beam selectively to one of a low beam and a high beam, said beam switching device comprising a bulb displacing mechanism that displaces said light source bulb in a predetermined direction relative to said reflector in a predetermined amount, beam switching being performed both by driving said bulb displacing mechanism to displace said light source bulb and by driving said leveling device to tilt said reflector.

2. The vehicle headlight according to claim 1, wherein said predetermined direction of said light source bulb is parallel to an optical axis of said reflector.

3. The vehicle headlight according to claim 2, wherein said bulb displacing mechanism moves along a slide shaft extending from the back side of said reflector, and said slide shaft substantially parallel to the optical axis of said reflector.

4. The vehicle headlight according to claim 1, wherein said bulb displacing mechanism pivots said light source bulb about an axis which is perpendicular to an optical axis of said reflector and horizontal to the ground.

5. The vehicle headlight according to claim 4, wherein said axis extends above said light source bulb, and said bulb displacing mechanism is disposed below said light source bulb.

6. The vehicle headlight according to claim 1, wherein said leveling device moves said reflector to a predetermined position within a leveling adjustment range, and said bulb displacing mechanism displaces said light source bulb backwardly when said beam switching device switches the beam to the high beam.

7. The vehicle headlight according to claim 6, wherein said leveling device comprises an actuator including an output rod for moving said reflector to the predetermined position.

8. The vehicle headlight according to claim 6, wherein said bulb displacing mechanism moves said light source bulb in parallel with an optical axis of said reflector.

9. The vehicle headlight according to claim 7, wherein said reflector has a reference angular position in which the low beam has a predetermined distribution therefor, said reference angular position determines a reference optical axis of said reflector, and said reference optical axis directs down below the horizontal line.

10. The vehicle headlight according to claim 9, wherein an optical axis of said reflector is tilted to an angular position about 0.5–1.5° upward said reference optical axis when said beam switching device switches the beam to the high beam.

11. The vehicle headlight according to claim 10, wherein an reference optical axis of said reflector directs 0.57° down below the horizontal line.

12. The vehicle headlight according to claim 6, wherein said light source bulb comprises a discharge light-emitting portion, and said bulb displacing mechanism displaces said light source bulb backwardly by a distance greater than one half the length of said discharge light-emitting portion when said beam switching device switches the beam to the high beam.

13. The vehicle headlight according to claim 12, wherein said distance is about 3 mm.

* * * * *